(12) United States Patent  
Chin et al.

(10) Patent No.: US 8,833,669 B1  
(45) Date of Patent: Sep. 16, 2014

(54) RFID TRANSMISSION CIRCUITRY

(71) Applicant: Verifone, Inc., San Jose, CA (US)

(72) Inventors: Yuan Fuat Chin, Singapore (SG); Choy Fong Poan, Singapore (SG)

(73) Assignee: Verifone, Inc., San Jose, CA (US)

( * ) Notice: Subject to any disclaimer, the term of this patent is extended or adjusted under 35 U.S.C. 154(b) by 0 days.

(21) Appl. No.: 13/887,783

(22) Filed: May 6, 2013

(51) Int. Cl.
*G06K 19/06* (2006.01)
*G06K 19/073* (2006.01)

(52) U.S. Cl.
CPC .................................. *G06K 19/073* (2013.01)
USPC ....................................................... 235/492

(58) Field of Classification Search
USPC ....................................................... 235/492
See application file for complete search history.

(56) References Cited

U.S. PATENT DOCUMENTS

2006/0192653 A1   8/2006   Atkinson et al.

*Primary Examiner* — Christle I Marshall
(74) *Attorney, Agent, or Firm* — Sughrue Mion, PLLC

(57) ABSTRACT

RFID transmission circuitry including a transmission module producing a pulsed output, a first threshold circuit providing a pulsed output including only pulses whose amplitude exceeds a first threshold level, a second threshold circuit providing a pulsed output including only pulses whose amplitude exceeds a second threshold level, which is less than the first threshold level, a gate circuit operative to provide a logic output in response to each clock input, the logic output being responsive to the presence or absence of a signal input pulse thereat, a power amplifier receiving the pulsed output of the transmission module and the logic output from the gate circuit as a gain control input and providing an amplified output responsive to the gain control input and an antenna which is driven by an input derived from the amplified output.

7 Claims, 3 Drawing Sheets

RFID TRANSMISSION CIRCUITRY

FIELD OF THE INVENTION

The present invention relates to RFID transmission circuitry generally.

BACKGROUND OF THE INVENTION

Various types of RFID transmission circuitry are known.

SUMMARY OF THE INVENTION

The present invention seeks to provide improved RFID transmission circuitry.

There is thus provided in accordance with a preferred embodiment of the present invention RFID transmission circuitry including a transmission module producing a pulsed output having non-uniform pulse amplitudes, a first threshold circuit receiving the pulsed output from the transmission module and providing a pulsed output including only pulses whose amplitude exceeds a first threshold level, a second threshold circuit receiving the pulsed output from the transmission module and providing a pulsed output including only pulses whose amplitude exceeds a second threshold level, which is less than the first threshold level, a gate circuit receiving, as a clock input, the pulsed output of the second threshold circuit and receiving, as a signal input, the pulsed output of the first threshold circuit, the gate circuit being operative to provide a logic output in response to each clock input, the logic output being responsive to the presence or absence of a signal input pulse thereat, a power amplifier receiving the pulsed output of the transmission module and the logic output from the gate circuit as a gain control input and providing an amplified output responsive to the gain control input and an antenna which is driven by an input derived from the amplified output.

Preferably, the RFID transmission circuitry also includes impedance matching circuitry in circuit between the power amplifier and the antenna. Additionally, the RFID transmission circuitry also includes a series connected resonating circuit and an EMI circuit between the power amplifier and the impedance matching circuitry.

In accordance with a preferred embodiment of the present invention the first threshold circuit includes a comparator. Additionally or alternatively, the second threshold circuit includes a comparator.

Preferably, the RFID transmission circuitry also includes a delay circuit receiving the pulsed output of the second threshold circuit as a clock input and outputting to the clock input of the gate circuit.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
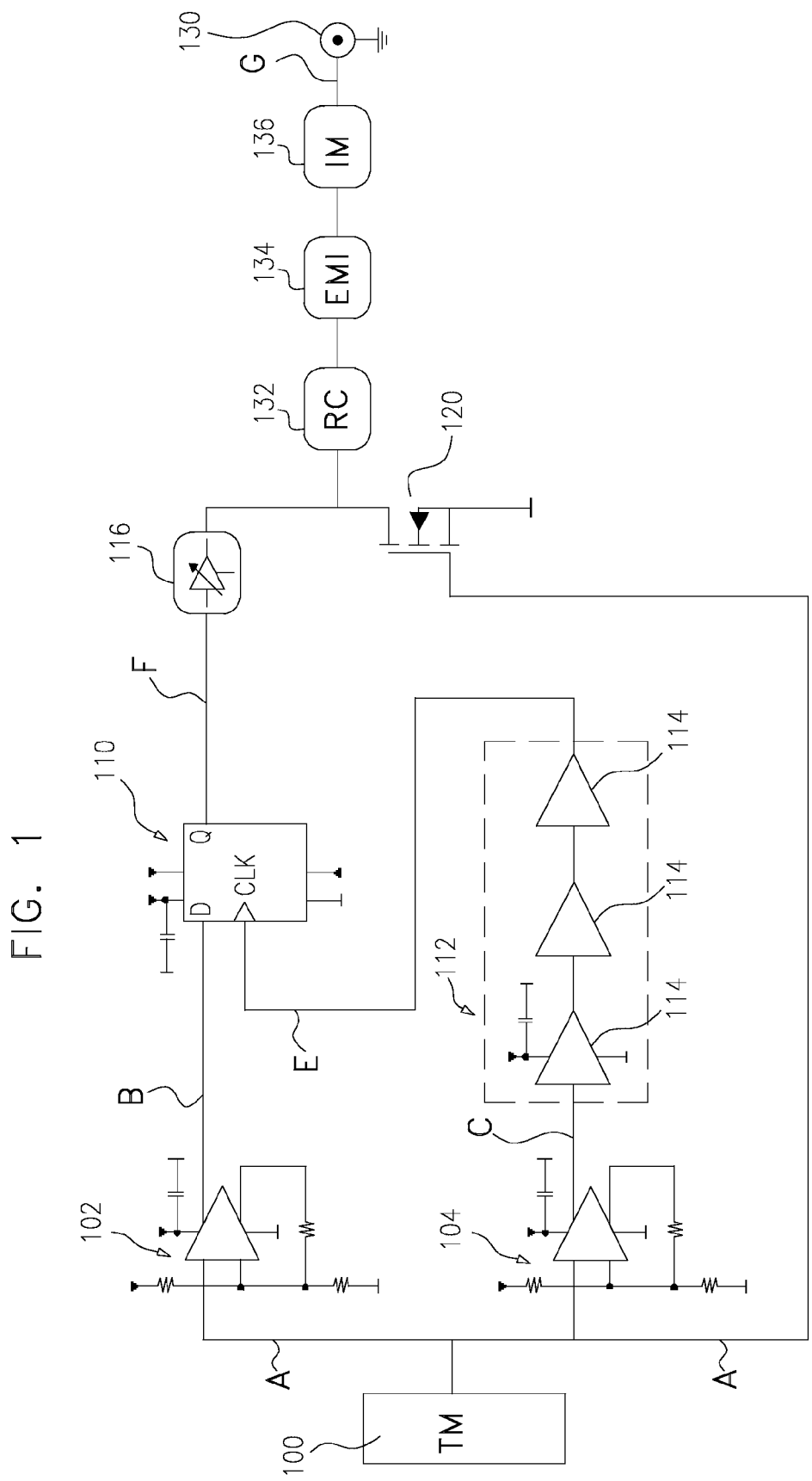
FIG. 1 is a simplified illustration of RFID transmission circuitry constructed and operative in accordance with a preferred embodiment of the present invention.
Figure 2A:
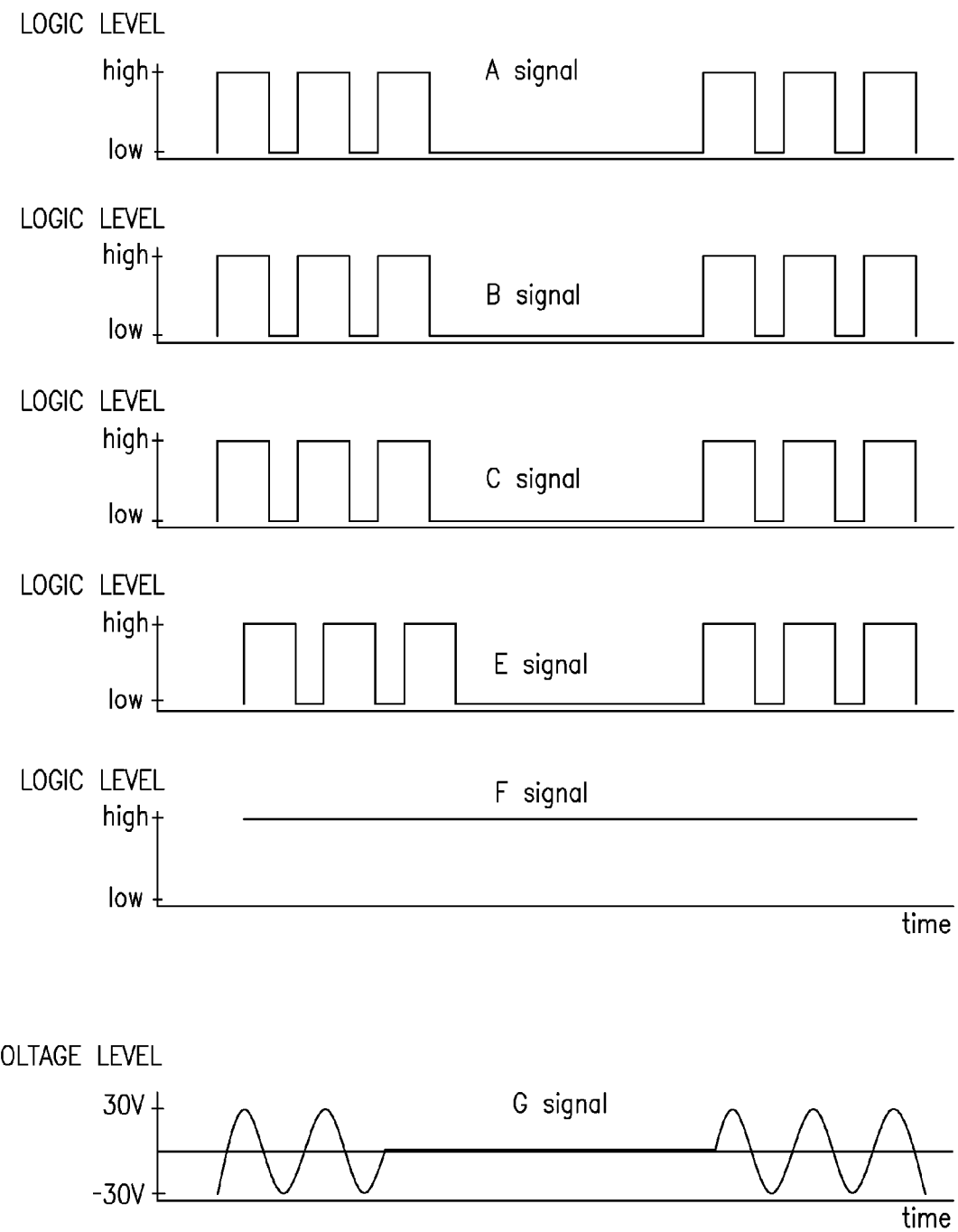
FIGS. 2A and 2B are, respectively, timing diagrams illustrating signals generated in the operation of the RFID transmission circuitry of FIG. 1 for type A and type B payment cards as defined in ISO Standard 14443.
Figure 2B:
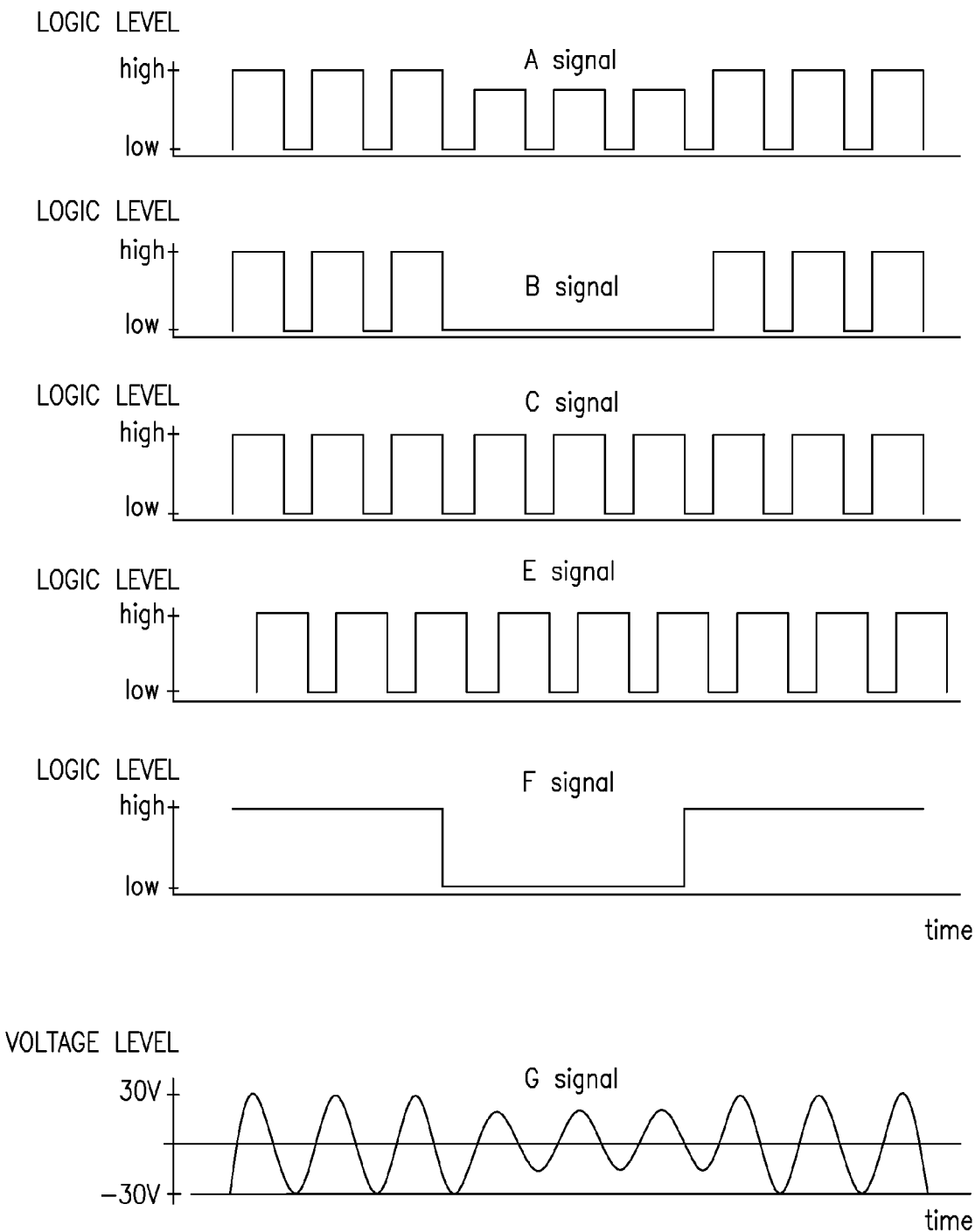

Reference is now made to FIG. 1, which is a simplified illustration of RFID transmission circuitry constructed and operative in accordance with a preferred embodiment of the present invention and to FIGS. 2A and 2B, which are, respectively, timing diagrams illustrating signals generated in the operation of the RFID transmission circuitry of FIG. 1 for type A and type B payment cards as defined in ISO Standard 14443.

In the illustrated embodiment of the present invention, a transmission module 100, preferably a PN512 transmission module, commercially available from NXP Semiconductors N.V. of Eindhoven, the Netherlands, provides parallel outputs, here designated by reference indicia A, to first and second threshold circuits 102 and 104, having different thresholds. Each of threshold circuits 102 and 104 is preferably embodied in a comparator, for example an LT1711 comparator, commercially available from Linear Technology Corporation of Milpitas, Calif., USA.

Comparator 102, which typically has a threshold between 10% modulation and no modulation, outputs to a signal input D of a gate circuit 110, such as a 74LCX74 D-type flip flop commercially available from Fairchild Semiconductor of San Jose, Calif., USA. This signal input to gate circuit 110 is designated by reference indicia B.

Comparator 104, which typically has a threshold close to a 100% modulation level, outputs, preferably via a delay circuit 112, to a clock input CLK of a gate circuit 110. The clock input to delay circuit 112 is designated by reference indicia C. The clock input to gate circuit 110 is designated by reference indicia E. Delay circuit 112 typically comprises a plurality of series-connected AND gates 114, such as 74LVCO8A Quad AND gates commercially available from NXP Semiconductors N.V. of Eindhoven, the Netherlands.

An output of gate circuit 110, typically the Q output, is preferably supplied as an input, designated by reference indicia F, to a non-inverting current boost voltage amplifier 116, typically comprising an operational amplifier, such as a THS4221 operational amplifier, commercially available from Texas Instruments Inc., Dallas, Tex., USA, driving an emitter follower power transistor, such as a BDP949 commercially available from Infineon Technologies, AG, Bavaria, Germany. The output of non-inverting current boost voltage amplifier 116 is supplied to a power amplifier 120, such as an N-type Class C MOSFET, commercially available from Vishay Intertechnology, Inc, Malvern, Pa., USA, which also receives the output A of transmission module 100 and amplifies it in accordance with the input F. In this embodiment, input F is supplied to the drain of the MOSFET as a gain control input and the output A of transmission module 100 is supplied to the gate of the MOSFET.

An input derived from the output of power amplifier 120, and designated by reference indicia G, is supplied to an antenna 130, such as a coil or conductor loop antenna, via series connected resonating circuit 132, comprising an LC circuit which preferably resonates at 13.56 MHZ, an EMI circuit 134 and an impedance matching circuit 136. Resonating circuit 132 and EMI circuit 134 are both operative to convert the square wave inputs thereto to a generally sinusoidal signal output having a frequency of 13.56 MHZ. It is appreciated that the amplitudes of the signals characteristic of Type A and Type B payment cards typically differ from each other.

Turning now to FIGS. 2A and 2B, there are seen timing diagrams for the signals designated A, B, C, E, F & G in the foregoing description, for both Type A and Type B payment cards respectively. In FIG. 2A, which relates to signals characteristic of Type A payment cards, it is seen that output signal pulses of transmission module 100, designated A, have uniform amplitudes. The output from comparator 102, designated B, shows that all of the pulses output by transmission module 100 are output to the gate circuit 110. The output designated E, from delay circuit 112, shows that, in this case, all pulses output by transmission module 100 are output as clock pulses to gate circuit 110. It is seen that output E is phase delayed with respect to output C. The output of gate circuit 110, designated F, is seen to be always in a high state, except when pulses are not output from comparator 102. The signal G is seen to be a sine wave which is interrupted in accordance with the modulation of signal A.

In FIG. 2B, which relates to signals characteristic of Type B payment cards, it is seen that output signal pulses of transmission module 100, designated A, have non-uniform amplitudes. The output from comparator 102, designated B, shows that the pulses having an amplitude below a given threshold are not output to the gate circuit 110. The output designated E, from delay circuit 112 shows that, in this case, all pulses output by transmission module 100 are output as clock pulses to gate circuit 110. It is seen that output E is phase delayed with respect to output C. The output of gate circuit 110, designated F, is seen to be in a high state when the pulse amplitude of the signal A is above the threshold of comparator 102 and in a low state when the pulse amplitude of the signal A is below the threshold of comparator 102. The signal G is seen to be a sine wave whose amplitude varies in accordance with the variations of the pulse amplitude of the signal A.

The RF signal modulation index indicates how much the modulation varies with respect to the carrier amplitude level and is defined as:

RF Signal Modulation Index=(carrier amplitude−peak value of message amplitude)/(carrier amplitude+ peak value of message amplitude).

For example, with type A payment card modulation, the Modulation index equals 1, which corresponds to Amplitude-shift keying (ASK) 100%. It is noted that the comparator 102 threshold is about 90% of signal A voltage level of FIGS. 2A and 2B, which corresponds to about Type B payment card ASK 10%. The comparator 104 threshold is very close to 0V, which corresponds to Type A ASK 100%.

In this way comparator 102 outputs a logical low when either Type A or Type B card payment modulation occur, and comparator 104 outputs a logical low only when Type A modulation occurs.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. RFID transmission circuitry comprising:
   a transmission module producing a pulsed output having non-uniform pulse amplitudes;
   a first threshold circuit receiving said pulsed output from said transmission module and providing a pulsed output including only pulses whose amplitude exceeds a first threshold level;
   a second threshold circuit receiving said pulsed output from said transmission module and providing a pulsed output including only pulses whose amplitude exceeds a second threshold level, which is less than said first threshold level;
   a gate circuit receiving, as a clock input, said pulsed output of said second threshold circuit and receiving, as a signal input, said pulsed output of said first threshold circuit, said gate circuit being operative to provide a logic output in response to each clock input, said logic output being responsive to the presence or absence of a signal input pulse thereat;
   a power amplifier receiving said pulsed output of said transmission module and said logic output from said gate circuit as a gain control input and providing an amplified output responsive to said gain control input; and
   an antenna which is driven by an input derived from said amplified output.

2. RFID transmission circuitry according to claim 1 and also including impedance matching circuitry in circuit between said power amplifier and said antenna.

3. RFID transmission circuitry according to claim 2 and also comprising a series connected resonating circuit and an EMI circuit between said power amplifier and said impedance matching circuitry.

4. RFID transmission circuitry according to claim 1 and wherein said first threshold circuit comprises a comparator.

5. RFID transmission circuitry according to claim 4 and wherein said second threshold circuit comprises a comparator.

6. RFID transmission circuitry according to claim 1 and wherein said second threshold circuit comprises a comparator.

7. RFID transmission circuitry according to claim 1 and also comprising a delay circuit receiving said pulsed output of said second threshold circuit as a clock input and outputting to said clock input of said gate circuit.

\* \* \* \* \*